(12) United States Patent
Leblans et al.

(10) Patent No.: US 7,180,086 B2
(45) Date of Patent: Feb. 20, 2007

(54) SYSTEM FOR READING OUT A PLURALITY OF DIFFERING STORAGE PHOSPHOR SCREENS

(75) Inventors: Paul Leblans, Kontich (BE); Luc Struye, Mortsel (BE)

(73) Assignee: Agfa-Gevaert, Mortsel (BE)

( * ) Notice: Subject to any disclaimer, the term of this patent is extended or adjusted under 35 U.S.C. 154(b) by 278 days.

(21) Appl. No.: 10/967,716

(22) Filed: Oct. 18, 2004

(65) Prior Publication Data

US 2005/0087707 A1   Apr. 28, 2005

(30) Foreign Application Priority Data

Oct. 24, 2003   (EP) .................................. 03103948

(51) Int. Cl.
   *G03B 42/08*   (2006.01)
(52) U.S. Cl. ..................................................... 250/584
(58) Field of Classification Search ................. 250/584
   See application file for complete search history.

(56) References Cited

U.S. PATENT DOCUMENTS

2006/0027770 A1 * 2/2006 Struye et al. ............... 250/586

FOREIGN PATENT DOCUMENTS

EP   1 359 204   5/2003

* cited by examiner

*Primary Examiner*—David Porta
*Assistant Examiner*—Chrisopher Webb
(74) *Attorney, Agent, or Firm*—Joseph T. Guy; Nexsen Pruet, LLC

(57) ABSTRACT

A system has been described for reading out a plurality of stimulable phosphor screens, plates or panels, after exposing said screens to X-rays having an energy in the range from 25 up to 150 kVp, the screens being selected from the group consisting of binder containing powder screens and binderless, crystalline or amorphous phosphor layer screens; wherein said phosphors are divalent europium activated alkali halide type phosphors wherein said halide is at least one of bromide or a combination of bromide with at least one of chloride and iodide, or divalent europium activated alkaline earth metal halide phosphors, wherein said halide is at least one of fluoride, chloride, bromide and iodide or a combination thereof, and wherein said screens are consecutively subjected to following steps of stimulating said phosphor screens by means of stimulation energy; detecting stimulated emission energy, emitted by the phosphor screen upon stimulation; converting detected energy into a signal representation of said radiation image; erasing said phosphor screen by exposing it to erasing energy; wherein differences in maximum wavelength of stimulation spectra of said differing screens are in the range from 10 nm up to 100 nm, wherein differences in maximum wavelength of stimulated emission spectra of said differing screens are in the range from 10 nm up to 150 nm, and wherein filtering means are provided for preventing stimulation radiation from being detected by detecting means, and for transmitting radiation emitted upon stimulation.

16 Claims, No Drawings

SYSTEM FOR READING OUT A PLURALITY OF DIFFERING STORAGE PHOSPHOR SCREENS

FIELD OF THE INVENTION

The present invention relates to a system for reading out a plurality of differing storage phosphor plates, avoiding errors in the handling of said storage phosphor plates, having been exposed and processed in an at random order in a radiographic environment.

BACKGROUND OF THE INVENTION

Opposite to conventional radiography wherein an intensifying luminescent phosphor screen directly emits luminescent radiation and wherein said screen is not a storage medium, radiation image recording and reproducing techniques utilizing a radiation image storage panel, referred to as the stimulable phosphor screen, sheet or panel, are provided with a stimulable phosphor. With radiation image recording and reproducing techniques, the stimulable phosphor of the radiation image storage panel is caused to absorb radiation, which carries image information of an object or which has been radiated out from a sample. Said stimulable phosphor is exposed to stimulating rays, such as visible light or infrared rays, which causes the stimulable phosphor to emit light in proportion to the amount of energy stored thereon during its irradiation exposure.

The emitted fluorescent light is then photoelectrically detected in order to obtain an electric signal. The electric signal is further processed, and the processed electric signal is utilized for reproducing a visible image on a recording material. This way of working, making use of storage phosphor sheets or panels as an intermediate storage medium is also called "computed radiography".

As in radiography it is important to have excellent image quality for the radiologist to make an accurate evaluation of a patient's condition, important image quality aspects are image resolution and image signal-to-noise ratio.

For computed radiography signal-to-noise ratio depends on a number of factors.

First, the number of X-ray quanta absorbed by the storage phosphor screen is important. Signal-to-noise ratio will be proportional to the square-root of the number of absorbed quanta.

Second, the so-called fluorescence noise is important. This noise is caused by the fact that the number of photostimulated light (PSL) quanta detected for an absorbed X-ray quantum is small. Since a lot of the PSL light is lost in the detection process in computer radiography, fluorescence noise has an important contribution to the signal-to-noise ratio. It is important that, on the average, at least 1 photon is detected for every absorbed X-ray quantum. If this is not the case, many absorbed X-ray quanta will not contribute to the image and signal-to-noise ratio will be very poor.

This situation is most critical in mammography, where X-ray quanta are used with low energy. Softer X-ray will give rise to less PSL centres and, therefore, to less PSL photons than harder X-rays.

In computer radiography, a number of PSL centres are created by the absorbed X-ray quanta. Not all PSL centres are stimulated in the read-out process, because of the limited time available for pixel stimulation and because of the limited laser power available. In practice, only about 30% of the PSL centres is stimulated to give rise to a PSL photon. Since these photons are emitted and scattered in all directions, only 50% of the PSL photons are emitted at the top side of the storage phosphor screen, where they can be detected by the detection system. The emitted PSL photons are guided towards the detector by a light guide. This light guide may consist of an array of optical fibres, that forms rectangular detection area above the storage phosphor screen and has a circular cross-section at the detector side. This type of light guide has a numerical aperture of only 30%, which means that only 1 out of 3 of the emitted PSL photons is guided to the detector. In between the light guide and the detector a filter is placed, which stops the stimulation light reflected by the storage phosphor screen and transmits the PSL light emitted by the screen. This filter also has a small absorption and reflection of PSL light and transmits only ca. 75% of the PSL photons. In computer radiography a photomultiplier is commonly used to transform the PSL signal into an electrical signal. At 440 nm the photomultiplier has a quantum efficiency of ca. 20%. This means that only 1 out of 5 PSL quanta that reach the photomultiplier are detected.

In summary, for 1,000 PSL centres that are created in the storage phosphor screen, only 1,000×0.3×0.5×0.3×0.75×0.2 or 6.75 PSL photons are detected. If it is required that every X-ray quantum gives rise to at least 1 detected PSL photon, therefore, the number of PSL centres created by an X-ray quantum should be sufficiently large. Or, conversely, the X-ray energy required to create a PSL-centre should be sufficiently small.

In mammography, a usual setting of the X-ray source is at 28 kVp. This leads to an X-ray spectrum, where the average energy of an X-ray quantum is of the order of 15 keV. For an X-ray quantum with this energy, in order to give rise to at least 1 detected PSL photon, the energy needed to create a PSL centre should be less than 15,000×6.75/1,000=100 eV.

Furtheron is well-known that fine detail visualisation, high-resolution high-contrast images are required for many X-ray medical imaging systems and particularly in mammography. The resolution of X-ray film/screen and digital mammography systems is currently limited to 20 line pairs/mm and 10 line pairs/mm, respectively. One of the key reasons for this limitation is associated with the phosphor particle size in the currently used X-ray screens. In particular, light scattering by the phosphor particles and their grain boundaries results in loss of spatial resolution and contrast in the image. In order to increase the resolution and contrast, scattering of the visible light must be decreased. Scattering can be decreased by reducing the phosphor particle size while maintaining the phosphor luminescence efficiency. Furthermore, the X-ray to light conversion efficiency, the quantum detection efficiency (e.g. the fraction of absorbed X-rays convertable to light emitted after stimulation) and the screen efficiency (e.g. the fraction of emitted light escaping from the screen after irradiation with stimulating rays) shouldn't be affected in a negative way by the reduction of the phosphor particle size. As a particular advantage the computed radiographic recording and reproducing techniques presented hereinbefore show a radiation image containing a large amount of information, obtainable with a markedly lower dose of radiation than in conventional radiography.

For clinical diagnosis and routine screening of asymptomatic female population, screen-film mammography today still represents the state-of-the-art for early detection of breast cancer. However, screen-film mammography has limitations which reduce its effectiveness. Because of the extremely low differentiation in radiation absorption densities in the breast tissue, image contrast is inherently low.

Film noise and scatter radiation further reduce contrast making detection of microcalcifications difficult in the displayed image. So e.g. film gradient must be balanced against the need for wider latitude.

Digital radiography systems can be broadly categorized as primary digital and secondary digital systems. Primary digital systems imply direct conversion of the radiation incident on a sensor into usable electrical signals to form a digital image. Secondary digital systems, on the other hand, involve an intermediary step in the conversion of radiation to a digital image. For example, in digital fluoroscopy, image intensifiers are used for intermediary conversion of X-rays into a visible image which is then converted to a digital image using a video camera. Similarly, digital X-ray systems using photostimulated luminescence (PSL) plates, first store the virtual image as chemical energy. In a second step, the stored chemical energy is converted into electrical signals using a laser to scan the PSL plate to form a digital image.

Furthermore, various schemes using silicon photodiode arrays in scanning mode for digital radiography systems have been employed. However, these photodiode arrays require intermediate phosphor screens to convert X-rays into visible light, because of the steep fall-off in quantum efficiency (sensitivity) of the arrays at energies above 10 keV.

As is well-known a stimulable phosphor to be incorporated in the phosphor-incorporated area, i.e., a phosphor which absorbs not only a radiation having a wavelength of lower than 250 nm but also visible or ultraviolet light in the wavelength region of 250 to 400 nm, giving a stimulated emission of a wavelength in the range of 300 to 500 nm when it is irradiated with stimulating rays of a wavelength in the range of 400 to 900 nm, is preferably employed.

Examples of well-known, frequently used stimulable phosphors include divalent europium activated phosphors (e.g., BaFBr:Eu, BaFBrI:Eu) or cerium activated alkaline earth metal halide phosphors and cerium activated oxyhalide phosphors, as well as e.g. a phosphor having the formula of $YLuSiO_5$:Ce,Zr.

In the present invention it is envisaged to use randomly one after another screen containing either, divalent europium activated alkali halide type phosphor screens, wherein said halide is at least one of chloride, bromide and iodide or a combination thereof divalent europium activated alkaline earth metal phosphor screens wherein said halide is at least one of fluoride, chloride, bromide and iodide or a combination thereof. Most preferred is random use of divalent europium activated CsX type phosphor screens, wherein said X represents Br or a combination of Br with at least one of Cl and I, as Br(Cl), Br(I) or Br(Cl, I) and bariumfluorohalide phosphor screens wherein the phosphor is of the $(Ba,M^{II})FX'$:Eu type, wherein $M^{II}$ is an alkaline earth metal and wherein X' is Cl, Br and/or I.

Crystalline divalent europium activated alkali halide phosphor screens advantageously have CsBr:$Eu^{2+}$ storage phosphor particles, in binderless layers in the form of cylinders (and even up to a needle-shaped form) wherein said cylinder has an average cross-section diameter in the range from 1 µm to 30 µm (more preferred: from 2 µm up to 15 µm), an average length, measured along the casing of said cylinder, in the range from 100 µm up to 1000 µm (more preferred: from 100 µm up to 500 µm) as has e.g. been described in EP-A 1 359 204. Such block-shaped, prismatic, cylindrical or needle-shaped phosphors, whether or not obtained after milling, are, in another embodiment, coated in a phosphor binder layer.

According to another embodiment of the present invention said stimulable phosphors are $(Ba,M^{II})FX'$:Eu type phosphors, wherein $M^{II}$ is an alkaline earth metal and wherein X' is Cl, Br and/or I. In a preferred embodiment, said $M^{II}$ is $Sr^{2+}$. Non-crystalline or amorphous europium activated alkaline earth metal halide phosphor screens advantageously have Ba(Sr)FBr:$Eu^{2+}$ storage phosphor particles, dispersed in a binder medium in their corresponding storage phosphor layers, are advantageously used in the system of the present invention.

From the point of view of practical use, the differing stimulable phosphor screens or panels are desired, all of them, in order to give stimulated emission in the wavelength region of 300–500 nm when excited with stimulating rays in the wavelength region of 500–850 nm. This is particularly important when the detector is a photomultiplier having the highest quantum efficiency in the blue region. The stimulation light can only be filtered away when the wavelength of the emission light is quite different from the green or red stimulation light, i.e. that there is no or a only negligable overlap between stimulation radiation and stimulated emission radiation spectrum. In favor of customer-friendly handling or manutention in a medical radiographic environment, wherein a lot of phosphor plates or panels are exposed and read-out (processed) one after another, even if processed in a random order, it is recommended that detection of the blue photostimulated light proceeds with blue light transmitting filters for all screens or panels, without the need to change filters inbetween consecutive readings. Use of only one and same filter for all of the differing plates scanned in one and same scanning unit, in applications requiring optimum image quality as well as in applications requiring ordinary image quality, would be highly desired, in favor of cost reduction as only one scanner would be required needed for both types of plates.

OBJECTS AND SUMMARY OF THE INVENTION

Therefore, it is a first object of the present invention to provide a system for reading out a plurality of differing storage phosphor panels used for distinct radiological applications and exposed to X-rays one after another, so that even when handled in a random order, no change in radiation transmitting filters is required when scanning said exposed storage phosphor panels.

More particularly, it is an object to make use of only one and same scanning unit, in applications requiring optimum image quality as well as in applications requiring ordinary image quality, thereby reducing costs.

It is therefore envisaged to provide a system for reading out a plurality of differing phosphor panels wherein a radiation image has been stored in photostimulable phosphor screens, wherein the screen is erased in between successive recordings to an adequate extent in order to permit immediate re-use of the screen. It is a further object of the present invention to provide such a system that is compact and has at the same time a high throughput.

Further advantages and embodiments of the present invention will become apparent from the following description and from the claims.

DETAILED DESCRIPTION OF THE INVENTION

When the term "differing" plates is used with respect to the present invention, it is meant that there is a difference in emission spectrum between those plates, panels or screens. Said difference is due to the presence of phosphor differing in composition. Storage phosphor screens in the system of the present invention are selected from the group consisting of binder containing powder screens and binderless, crystalline or amorphous phosphor layer screens, wherein said phosphors are divalent europium activated alkali halide type phosphors or alkaline earth metal halide phosphors, wherein said halide is at least one of fluoride, chloride, bromide and iodide or a combination thereof.

In one embodiment it is recommended to make use of screens or panels provided with CsBr:Eu-type phosphors, whether in form of binderless needle-shaped phosphors, or in form of binder containing powder phosphor screens.

Moreover it has been established that storage phosphor plates or panels coated with a BaFBr:Eu-type phosphor as e.g. in a binder coated BaF(I, Br):Eu or Ba(Sr)FBr:Eu phosphor layer, as desired layers of a divalent europium activated alkaline earth metal halide phosphors do not require change of filters and are processed after exposure in the same scanning unit without any problem. Other storage phosphors suitable for use in phosphor screens or plates are e.g. alkali metal phosphors, corresponding to formula I hereinafter:

$$M^{1+}X.aM^{2+}X'_2bM^{3+}X''_3:cZ \qquad (I)$$

wherein:

$M^{1+}$ is at least one member selected from the group consisting of Li, Na, K, Cs and Rb, $M^{2+}$ is at least one member selected from the group consisting of Be, Mg, Ca, Sr, Ba, Zn, Cd, Cu, Pb and Ni, $M^{3+}$ is at least one member selected from the group consisting of Sc, Y, La, Ce, Pr, Nd, Pm, Sm, Eu, Gd, Tb, Dy, Ho, Er, Tm, Yb, Lu, Al, Bi, In and Ga, Z is at least one member selected from the group $Ga^{1+}$, $Ge^{2+}$, $Sn^{2+}$, $Sb^{3+}$ and $As^{3+}$, X, X' and X" can be the same or different and each represents a halogen atom selected from the group consisting of F, Br, Cl, I and $0 \leq a \leq 1$, $0 \leq b \leq 1$ and $0 < c \leq 0.2$. Such phosphors have been disclosed in, e.g., U.S. Pat. No. 5,736,069.

According to the system of the present invention divalent europium activated alkali halide type phosphor screens are preferred, wherein in said storage phosphors, a preferred halide is at least one of chloride, bromide and iodide or a combination thereof, and wherein, in an even more preferred embodiment, divalent CsX type phosphors (CsX:Eu-type) are used, wherein X represents Br or a combination of Br and at least one of Cl and I (as a bromohalide phosphor).

In the system according to the present invention a divalent europium activated CsBr type phosphor is most preferably used.

Highly preferred phosphors present in the phosphor screen, panel or plate used in the system of the present invention are those phosphors, preferably prepared by a method comprising the steps of:

mixing said CsX with between $10^{-3}$ and 5 mol % of an Europium compound selected from the group consisting of $EuX''_2$, $EuX''_3$ and $EuOX''$, X" being a member selected from the group consisting of F, Cl, Br and I, firing said mixture at a temperature above 450° C.

cooling said mixture and recovering the CsX:Eu phosphor.

Most preferably a CsBr:Eu stimulable phosphor is thus present in a storage phosphor panel in the system of the present invention and the said phosphor is most preferably prepared by the method comprising the steps of:

mixing said CsX with between $10^{-3}$ and 5 mol % of an Europium compound selected from the group consisting of $EuX'_2$, $EuX'_3$ and $EuOX''$, X" being a member selected from the group consisting of F, Cl, Br and I, firing said mixture at a temperature above 450° C.

cooling said mixture and recovering the CsX:Eu phosphor.

Binderless screens can be prepared by bringing the finished phosphor on the support by any method selected from the group consisting of thermal vapor deposition, chemical or physical vapor deposition, electron beam deposition, radio frequency deposition and pulsed laser deposition, without however being limited thereto. It is also possible however to bring the alkali metal halide and the dopant together and depositing them both on the support in such a way that the alkali metal phosphor is doped during the manufacturing of the screen.

The method for manufacturing a binderless phosphor screen containing a CsX:Eu stimulable phosphor, wherein X represents Br or a combination of Br with a halide selected from the group consisting of Cl and I preferably comprises the steps of:

bringing multiple containers of said CsX and an Europium compound selected from the group consisting of $EuX''_2$, $EuX''_3$ and $EuOX''$, X" being a halide selected from the group consisting of F, Cl, Br and I in condition for vapor deposition and depositing, by a method selected from the group consisting of, thermal vapor deposition, chemical vapor deposition, electron beam deposition, radio frequency deposition and pulsed laser deposition, both said CsX and said Europium compound on a substrate in such a ratio that on said substrate a CsX phosphor, doped with between $10^{-3}$ and 5 mol % of Europium, is formed.

The deposition may proceed from a single container containing a mixture of the starting compounds in the desired proportions. Thus the method further encompasses a method for manufacturing a binderless phosphor screen containing a CsX:Eu-type stimulable phosphor, wherein X represents a halide selected from the group consisting of Br, Cl and I and combinations thereof comprising the steps of:

mixing said CsX with between $10^{-3}$ and 5 mol % of an Europium compound selected from the group consisting of $EuX''_2$, $EuX''_3$ and $EuOX''$, X" being a halide selected from the group consisting of F, Cl, Br and I;

bringing said mixture in condition for vapor deposition and depositing said mixture on a substrate by a method selected from the group consisting of physical vapor deposition, thermal vapor deposition, chemical vapor deposition, electron beam deposition, radio frequency deposition and pulsed laser deposition.

According to the system of the present invention phosphors are coated on a substrate in a phosphor layer selected from the group consisting of a binderless phosphor layer, a binder medium layer.

In one embodiment according to the system of the present invention said binderless phosphor layer screens are provided with needle-shaped phosphors, having phosphor needles, aligned in parallel, under an angle in a range between 60° and 90° verus said substrate.

In another embodiment according to the system of the present invention a binder medium layer is used containing ground needle-shaped CsX:Eu-type phosphor in non-aligned powdery form, X being defined as hereinbefore, and more particularly a CsBr:Eu type phosphor.

In still another embodiment according to the system of the present invention said crystalline layer comprises said phosphor in a homogeneously solidified form.

A particular advantage of the present invention is related with the use of only one and same filter for all of the differing storage phosphor plates coated with, especially, the preferred CsBr:Eu-type phosphors and the preferred BaFBr: Eu-type phosphors, scanned in one and same scanning unit and used in applications requiring optimum image quality as well as in applications requiring normal image quality.

According to the present invention a system is offered for reading out a plurality of stimulable phosphor screens, plates or panels, after exposing said screens to X-rays having an energy in the range from 25 up to 150 kVp, the phosphors of which are coated on a substrate in a phosphor layer selected from the group consisting of a binderless phosphor layer and a binder medium layer hereinbefore; wherein said phosphors are divalent europium activated alkali halide type phosphors, wherein said halide is at least one of chloride, bromide and iodide or a combination thereof, or wherein said phosphors are divalent europium activated alkaline earth metal halide type phosphors, wherein said halide is at least one of fluoride, chloride, bromide and iodide or a combination thereof and wherein said screens are consecutively subjected to following steps:

(1) stimulating said phosphor screens by means of stimulation energy, (2) detecting stimulated emission energy, emitted by the phosphor screen upon stimulation, (3) converting detected energy into a signal representation of said radiation image, (4) erasing said phosphor screen by exposing it to erasing energy, characterized in that (1) differences in position of the maxima in the stimulation spectra of said differing screens are in the range from 10 nm up to 100 nm, (2) differences in the position of the maxima in the stimulated emission spectra of said differing screens are in the range from 10 nm up to 150 nm (3) filtering means are provided for preventing stimulation radiation from being detected by detecting means, and for transmitting radiation emitted upon stimulation, wherein said filter transmits radiation in the range from 390 nm to 460 nm, more preferably from 380 nm to 480 nm and even more preferably 350 nm to 500 nm (thereby blocking red light from being transmitted).

A system according to the present invention is advantageously provided with filtering means comprising a dye, absorbing radiation (light) in the wavelength range from 390 up to 460 nm, preferably from 380 nm up to 480 nm and even more preferably in the system of the present invention said filtering means comprises a dye, transmitting light in the wavelength range from 350 nm up to 500 nm. This particular part of the system effectively prevents (red to infrared) stimulation light to be captured by the detecting means, which should be sensitive in the blue wavelength range of the spectrum as stimulated radiation emitted by the storage phosphor is in the blue wavelength range. A system according to the present invention is thus most preferably provided with a filter, comprising a suitable dye compound.

A system according to the present invention, is further provided with means so that converting detected energy into a signal representation of said radiation image, proceeds via an array of transducer elements.

Moreover in a preferred embodiment in the system according to the present invention, erasing light is emitted by an erasing light source assembly emitting in the wavelength range of 300 nm to 1500 nm. Even more preferred is a system wherein said light source has an electrical power not greater than 1 J per cm$^2$ of said phosphor screen in order to reduce energy (heat) and in order to make quick re-use possible.

As a particularly advantageous effect resulting from the system of the present invention, use of only one blue light transmitting filter is provided, for powdery binder containing screens, as well as for binderless (crystalline, needle-shaped) divalent europium activated alkali halide phoshor screens as disclosed hereinbefore.

In the system of the present invention use of two differing scanners, each of them having a differing filter, is thus avoided.

While the present invention will hereinafter be described in connection with preferred embodiments thereof, it will be understood that it is not intended to limit the invention to those embodiments.

EXAMPLES

A. Inventive Panel Coated with Ba(Sr)FBr:Eu Phosphor Plates

Phosphor Layer Composition:

| | |
|---|---:|
| BAEROSTAB M36 (from Bärlöcher GmbH) | 1.5 g |
| DISPERSE AYD 9100 (from Daniel Produkts Company) | 0.75 g |
| KRATON FG19101X (from Shell Chemicals) | 12.5 g |
| Ba(Sr)FBr:Eu (mean particle size: 7 μm) | 270 g |
| Ba(Sr)FBr:Eu (mean particle size: 3 μm) | 30 g |

Preparation of the Phosphor Laquer Composition:

BAEROSTAB M36, DISPERSE AYD 9100 and KRATON FG19101X were dissolved while stirring in the prescribed amounts in 61.5 g of a solvent mixture from wash benzine 100–120, toluene and butyl acrylate in ratios by volume of 50:30:20. The phosphors were added thereafter and stirring was further proceeded for another 10 minutes at a rate of 1700 r.p.m.

The composition was doctor blade coated at a coating rate of 2.5 m per minute onto a subbed 175 μm thick polyethylene terephthalate support and dried at room temperature during 30 minutes. In order to remove volatile solvents as much as possible the coated phosphor plate was dried at 90° C. in a drying stove.

B. Inventive Panel Coated with Binderless, Needle-shaped CsBr:Eu Phosphor Plates CsBr:Eu screens were made via thermal vapor deposition of CsBr and EuOBr. Therefore CsBr was mixed with EuOBr and placed in a container in a vacuum deposition chamber. The CsBr:Eu phosphor was prepared by the method comprising the steps of:

mixing said CsBr with between $10^{-3}$ and 5 mol % of EuOBr and bringing said mixture in condition for vapor deposition;

firing said mixture at a temperature above 450° C. and depositing said mixture on the support by the method of physical vapor deposition;

cooling said mixture.

More particularly the container with starting materials was heated to a temperature of 750° C. and the phosphor was deposited on a glass disk with a thickness of 1.5 mm and a diameter of 40 mm. The distance between the container and the substrate was 10 cm. During evaporation, the substrate was rotated at 12 r.p.m. Before the start of the evaporation, the chamber was evacuated to a pressure of 4.10 mbar and during the evaporation process, Ar was introduced in the chamber. The Eu-concentration in the evaporated screens was measured with X-ray fluorescence and was of the order of 800 ppm. Deposited needles had a length of about 750 μm (average length) and a diameter of about 4 μm (average diameter).

C. Inventive Panel Coated with Powdery CsBr:Eu Phosphor Plates

In radiographic applications wherein a lower sensitivity is desired, needle-shaped phosphors with smaller needles are more efficient, moreover from a point of view of enhanced image quality (as sharpness, especially desired in e.g. mammographic applications).

So from the needle-shaped CsBr:Eu phosphors deposited as in Inventive Panel B, needles were scraped off and ground in order to get needles having a length of about 250 μm instead of 750 μm as an average length. The same phosphor layer and lacquer composition was taken as in comparative phosphor layer A hereinbefore, in order to get about the same doctor blade coating, except for the phosphor used therein.

D. Inventive Panel Coated with Powdery CsBr:Eu Phosphor Plates

Just as in Inventive panel C, the binderless phosphor needles were ground, but a binderless layer was obtained by melting them on the same support as in panel C. A homogeneous layer was thereby obtained.

E. Inventive Layer from a Melt Having CsBr:Eu Phosphor Composition

In an aluminum oxide crucible, the depth of which was decreased in order to mount it in a scanning apparatus afterwards, 0.5 grams of CsBr:Eu phosphor were put in an oven. In order to avoid contamination nitrogen was flushed throughout the environment while heating the phosphor material in the crucible very slowly, up to a temperature exceeding the melting temperature of 760° C. with at most 10° C. Once the phosphor was in a molten aggregation state, a thin liquid, perfectly spread layer was formed on the bottom of the crucible. Then the solidifying process was started by cooling the crucible at a rate of 2° C. per minute and a layer the melt was formed, having a CsBr:Eu composition.

For all of those panels A–E an X-ray exposure having an energy of 80 kVp and 35 kVp was applied. The stored energy was read out in a scanner made up with a diode laser (685 nm) provided with a red filter having a maximum transmission at the same wavelength. The beam (30 mW red diode laser) was focussed to a small spot of 100 μm is and the blue stimulated light was filtered with a blue filter (containing an organo-cobalt dye pigment) having a maximum transmission in the desired wavelength range from 390 nm up to 450 nm.

According to the system of the present invention it has been shown that each of the panels, whether in form of binderless needles or ground needles coated in a binder material layer, whether in form of a melt of main components or a melt of (ground) needles, when scanned and read out one after another in an at random order there is no need to change the blue light transmitting filter used.

Accordingly ability of making use of only one scanner is remarkably interesting, more particularly from a point of view of investment.

Having described in detail preferred embodiments of the current invention, it will now be apparent to those skilled in the art that numerous modifications can be made therein without departing from the scope of the invention as defined in the appending claims.

What is claimed is:

1. A system for reading out a plurality of differing stimulable phosphor screens, plates or panels, after exposing said screens to X-rays having an energy in the range from 25 up to 150 kVp, the phosphors of which are coated on a substrate in a phosphor layer selected from the group consisting of binder containing powder screens and binderless, crystalline phosphor layer screens; wherein said screens are consecutively subjected to following steps:
1) Stimulating said screens with stimulation light,
2) detecting stimulated emission light, emitted by the phosphor screen upon stimulation;
3) converting detected light signal into a digital representation of said radiation image;
4) erasing said phosphor screen by exposing it to erasing energy;
whereby the differences in the position of the maxima in the stimulation spectra of said differing screens are in the range from 10 nm up to 100 nm, whereby the differences in position of the maxima in the stimulated emission spectra of said differing screens are in the range from 10 nm up to 150 nm, and wherein filtering means are provided for preventing stimulation radiation from being detected by detecting means, and for transmitting radiation emitted upon stimulation.

2. A system according to claim 1, wherein said phosphors are divalent europium activated CsX type phosphors, wherein said X represents Br or a combination of Br with at least one of Cl and I.

3. A system according to claim 2, wherein said binder medium layer of ground needle-shaped CsBr:Eu-type phosphor in non-aligned powdery form.

4. A system according to claim 2, wherein said crystalline layer comprises said phosphor in a homogeneously solidified form.

5. A system according to claim 1, wherein said phosphors are $(Ba,M^{II})FX':Eu$ type phosphors, wherein $M^{II}$ is an alkaline earth metal and wherein X' is Cl, Br and/or I.

6. A system according to claim 5, wherein $M^{II}$ is $Sr^{2+}$.

7. A system according to claim 1, wherein both divalent europium activated CsX type phosphors, wherein said X represents Br or a combination of Br with at least one of Cl and I phosphors and $(Ba,M^{II})FX':Eu$ type phosphors, wherein $M^{II}$ is an alkaline earth metal and wherein X' is Cl, Br and/or I are used.

8. A system according to claim 7, wherein said binder medium layer of ground needle-shaped CsEr:Eu-type phosphor in non-aligned powdery form.

9. A system according to claim 7, wherein said crystalline layer comprises said phosphor in a homogeneously solidified form.

10. A system according to claim 1 wherein said filtering means comprises a dye, transmitting light in the wavelength range from 350 nm up to 500 nm.

11. A system according to claim 10, wherein said binder medium layer of ground needle-shaped CsBr:Eu-type phosphor in non-aligned powdery form.

12. A system according to claim 10, wherein said crystalline layer comprises said phosphor in a homogeneously solidified form.

13. A system according to claim 1, wherein said binderless phosphor layer screens are provided with needle-shaped phosphors, having phosphor needles, aligned in parallel, under an angle in a range between 60° and 90° verus said substrate.

14. A system according to claim 1, wherein said binder medium layer of ground needle-shaped CsBr:Eu-type phosphor in non-aligned powdery form.

15. A system according to claim 1, wherein said crystalline layer comprises said phosphor in a homogeneously solidified form.

16. A system according to claim 1, wherein converting detected energy into a signal representation of said radiation image, proceeds via an array of transducer element.

* * * * *